United States Patent [19]
Wagner

[11] 3,884,502
[45] May 20, 1975

[54] SEMITRAILER OR THE LIKE

[76] Inventor: Ray B. Wagner, 32783 Sumac St., Union City, Calif. 94587

[22] Filed: Dec. 17, 1973

[21] Appl. No.: 425,538

[52] U.S. Cl.......................... 280/423 R; 280/124 F
[51] Int. Cl............................................. B62d 53/06
[58] Field of Search ............ 280/415, 418, 423, 80, 280/81, 124 F, 425

[56] References Cited
UNITED STATES PATENTS

| | | | |
|---|---|---|---|
| 2,590,962 | 4/1952 | Gurton | 280/418 X |
| 2,751,234 | 6/1956 | Couse | 280/415 B X |
| 3,211,313 | 10/1965 | Katz | 280/418 X |
| 3,347,563 | 10/1967 | Harbers | 280/425 R |

*Primary Examiner*—David Schonberg
*Assistant Examiner*—R. Schrecengost
*Attorney, Agent, or Firm*—Joseph B. Gardner; Theodore J. Bielen, Jr.; Richard Esty Peterson

[57] ABSTRACT

The invention concerns the semitrailer of a tractor-trailer rig, and adjacent its forward end, the trailer has the usual king-pin to enable it to be releasably connected to the fifth-wheel assembly of a tractor having an air-suspension drive wheel assembly. An air-supension wheel assembly in the form of a dolly or carriage is removably secured to the trailer adjacent the rear end thereof. Fastener mechanism enables the rear wheel assembly to be securely attached to the trailer when desired, and the trailer is further equipped with a depending support structure intermediate the ends thereof which is adapted to provide an auxiliary cargo space and also to support the trailer upon removal of both the tractor and the rear wheel assembly therefrom. Means are provided for overriding the usual leveling system for the wheel assembly so that the air springs thereof can be both overinflated to raise the trailer to an abnormally high elevation, and for underinflating the air springs so that the trailer tends to descend to an abnormally low elevation. The tractor and rear wheel assembly can each be removed by overinflating the air springs, placing block-type supports under the support structure, and then underinflating the air springs whereupon the wheel assemblies, when the fastener mechanism is released, tend to descend to a position free from the trailer so that they can be removed therefrom.

11 Claims, 9 Drawing Figures

SEMITRAILER OR THE LIKE

This invention relates to land vehicles such as tractor-trailer rigs and, more particularly, to semitrailers and the like including dry-freight vans, open flatbeds, liquid tank trailers, etc.

The usual semitrailer of the type being considered provides frame structure defining a chassis equipped with load carrying apparatus of a character appropriate to the type of freight or merchandise to be handled thereby. Adjacent its rear end, such trailer is equipped with a wheel assembly that rollingly supports the same for road and other transport. Adjacent its forward end, the trailer has a depending king-pin releasably interconnectable with the fifth-wheel assembly of a tractor by means of which motive power is applied to the trailer. Since the tractor can be separated from the trailer, it is necessary that the trailer be provided with support means adjacent its forward end, and such means are generally referred to in the industry as a "landing gear".

In some states, it is permissible for one tractor to pull two trailers interconnected one to another in a tandem orientation. It is evidently necessary, then, to provide auxiliary wheel-equipped carriages adapted to be releasably connected with the king-pin of a trailer to serve the support function of the rear wheel assembly of the tractor, and which auxiliary wheel assemblies are provided with tongues or comparable means to enable them to be connected to the rear of a preceding trailer in a tandem orientation therewith. Thus, a single trailer can be coupled in the alternative directly to the fifth-wheel assembly of a tractor, or to the counterpart fifth-wheel assembly of an auxiliary wheel-equipped carriage.

The versatility of conventional semitrailers does not extend beyond such alternate interconnection and use as a transport for merchandise from one location to another, and whereas it often would be convenient and otherwise advantageous to use such trailers as temporary storage at their points of destination, it is usually not economically practicable to do so because the trailer is a very expensive warehouse or storage facility owing to the relatively high cost thereof. In this reference, the most common semitrailers are large box-like containers equipped with a frame to support such container, and further equipped with a wheel assembly or running gear usually of the double or tandem-axle type. It will be apparent that a large part of the total cost of such trailer is invested in the wheel assembly which is much more complex and intricate than the rather simple box-like container.

In view of the foregoing, a general object of the present invention is to provide an improved semitrailer or the like having significantly more versatility than its conventional counterpart, and which can be used, when desired, with economic feasibility as a storage facility either on a temporary or semi-permanent basis and, because of its mobility, is especially useful in this respect at remote locations.

Further objects, among others, of the present invention are in the provision of an improved trailer of the character described in which the rear wheel assembly thereof is removable so that the trailer can be made devoid of wheels and other undercarriage assemblies to enable it to provide an economic storage facility; in which the trailer is equipped with a removable air-suspension wheel assembly having means for overpressurizing the air springs or air-suspension thereof to enable the trailer to be raised to an abnormal elevation, and also for underpressurizing such air-springs or air-suspension system to enable the wheel assembly to be withdrawn downwardly from the trailer; in which particular fastener mechanism is included for releasably securing the wheel assembly to the frame structure of the trailer; in which a network of constraints that may take the form of tongue and groove elements is operative between the trailer and wheel assembly to constrain the same against relative transverse and longitudinal displacements when the fastener mechanism is secured; and in which support structure is included that is secured to and depends from the frame structure of the trailer to support the same upon removal of the rear wheel assembly and tractor, such support structure also serving as a cargo carrier to provide the trailer with additional space for transport and storage of merchandise.

Additional objects and advantages of the invention, especially as concerns particular features and characteristics thereof, will become apparent as the specification continues.

An embodiment of the invention is illustrated in the accompanying drawings, in which.

Figures 1, 2:
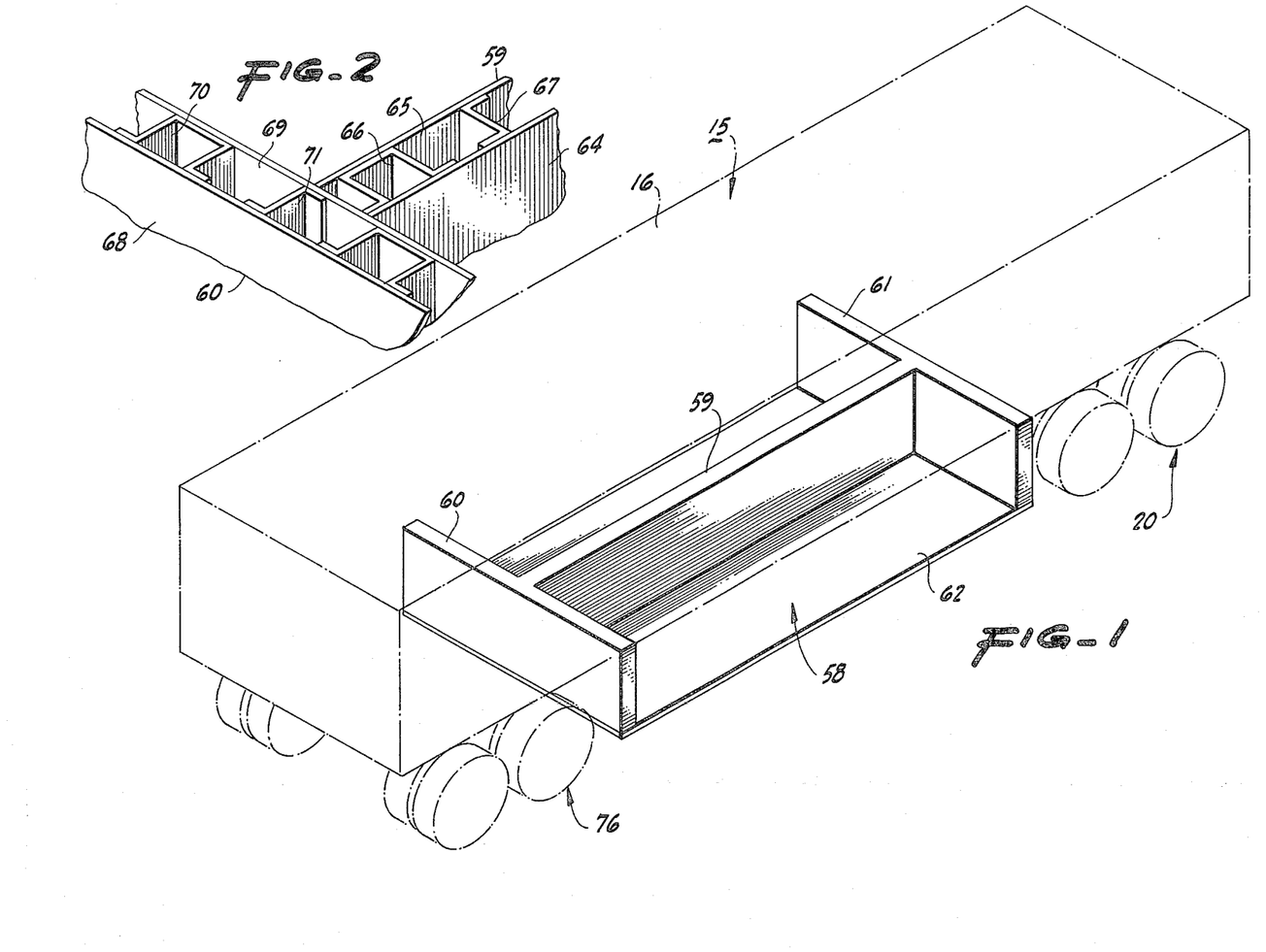
FIG. 1 is generally a diagrammatic view illustrating a semitrailer equipped with support structure embodying the present inveniton.
FIG. 2 is an enlarged, broken perspective view illustrating a portion of the support structure shown in FIG. 1.

The semitrailer illustrated diagrammatically in FIG. 1 is denoted in its entirety with the numeral 15, and in the form shown includes a large box-like container 16 defining a freight compartment. Semitrailers of this type are conventional and are sometimes referred to as "dry-freight vans". The invention is equally applicable to other semitrailers and vehicles including open flat-bed trailers, liquid tank trailers, containers for fluidizable materials, etc.

Figures 6, 8:
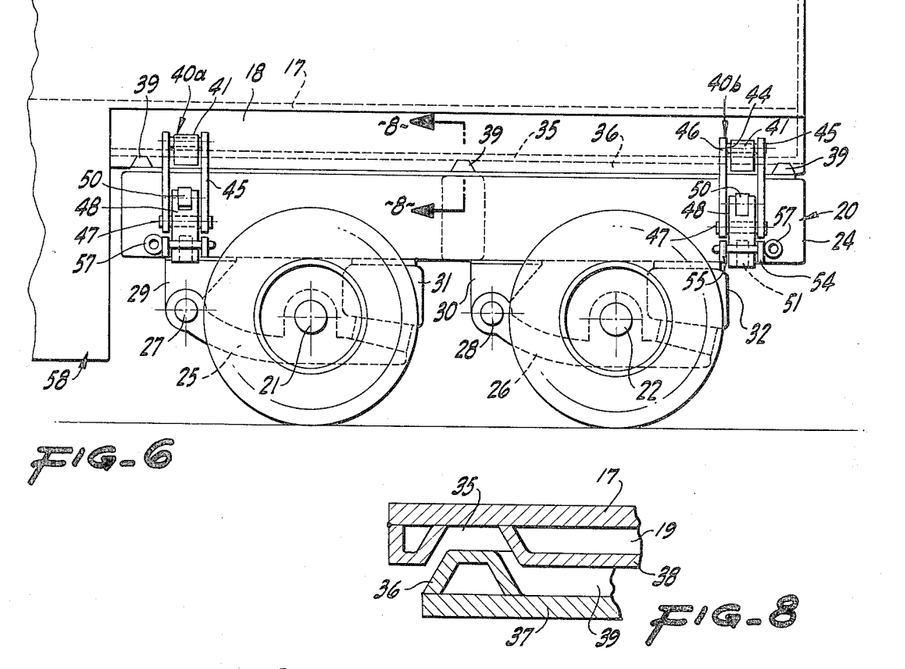
FIG. 6 is an enlarged, broken side view in elevation of the rear wheel assembly and semitrailer.
FIG. 8 is a further enlarged, broken vertical sectional view taken along the line 8—8 of FIG. 6.
Figure 7:
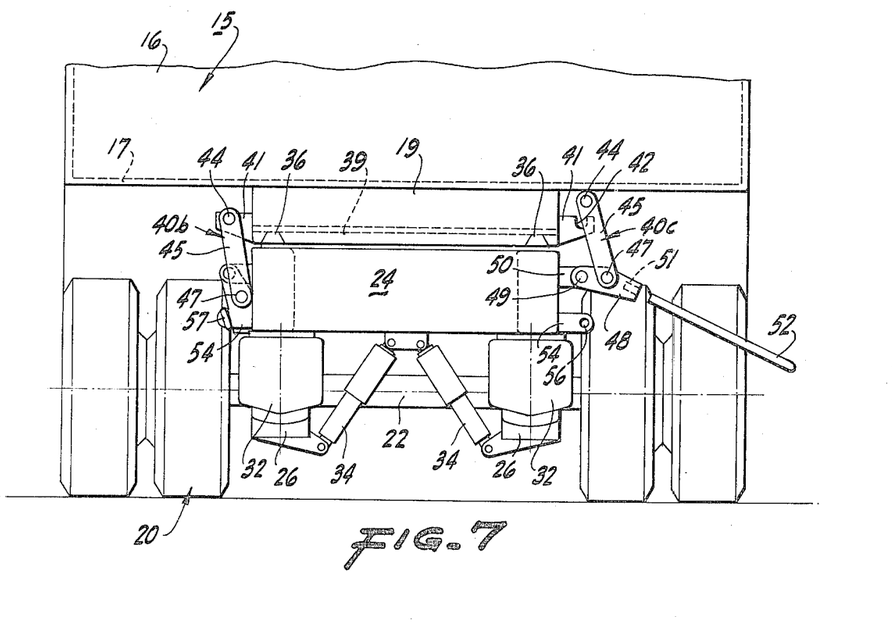
FIG. 7 is a rear view in elevation of the wheel assembly and trailer apparatus shown in FIG. 6.

The trailer 15 includes frame structure defining a chassis upon which the load-carrying apparatus of the vehicle is mounted which, in the trailer 15, constitutes the van or box-like container 16. Referring to FIGS. 6 through 8, the frame structure of the trailer is shown in part at 17, and it includes a plurality of longitudinally extending frame or chassis elements 18 and a plurality of transversely extending frame or chassis elements 19. For the most part, the frame structure 17 of the trailer and load-carrying apparatus 16 thereof may be conventional and follow standard practice in the art. Accordingly, such structure is usually fabricated all or in part of strong materials such as metal and usually steel.

Adjacent one end thereof which constitutes the rear end in the trailer 15 being considered, an air-suspension wheel assembly 20 is removably secured to the frame structure of the trailer. In general terms, the wheel assembly 20 is conventional, and in the form shown, it is a tandem assembly having front and rear axles 21 and 22 secured to a box frame 24 and each equipped with dual wheels adjacent each end thereof, as shown most clearly in FIG. 7. The axles 21 and 22 are respectively supported in mountings provided therefor intermediate the end of arms 25 and 26, respectively, which at one end are pivotally supported for angular displacements about the axes of shafts 27 and 28 mounted in brackets 29 and 30 welded or otherwise fixedly secured to the frame 24 of the wheel assembly. Accordingly, each axle 21 and 22 may swing upwardly and downwardly relative to the frame 24 in counterclockwise and clockwise directions, as viewed in FIG. 6, about the axes of the pins 27 and 28.

Adjacent their opposite ends, the arms 25 and 26 are connected with the frame 24 by means of air springs 31 and 32 that are structurally and functionally interposed between the arms and frame, as illustrated in both FIGS. 6 and 7. As stated, and as shown in FIG. 7, the wheel assembly 20 is essentially symmetrical about the longitudinal centerline thereof, wherefor duplicate structures are provided along each side of the assembly. Thus, the duplicate right-hand and left-hand air springs shown in FIG. 7 are denoted with the same numeral. It will be apparent that the exact disposition of each of the arms 25 and 26 and of the axles 21 and 22 respectively associated therewith referenced to the frame 24 will depend upon the extent to which the air springs 31 and 32 are pressurized. That is to say, increasing the pressurization in the air springs 31 and 32 will cause the frame 24 to rise relative to the axles 21 and 22 and tire-equipped wheels mounted thereon, and vice versa.

The wheel assembly 20 is further equipped with shock absorbers 34 operative between the frame 24 and spring-equipped ends of the arms 25 and 26, as shown in FIG. 7. The shock absorbers dampen oscillatory displacements of the frame 24 and associated commponents relative to the wheel-equipped axles 21 and 22. The wheel assembly 20 is further equipped with stabilizer bars, rubber bumpers, and similar parts and components (none of which are illustrated), all as is well known and conventional in the art. As respects such details, the wheel assembly 20 may be taken to be a Neway tandem air suspension sold by the Neway Equipment Company. Since such details form no part of the present invention, a complete consideration thereof will not be presented.

The trailer 15 and wheel assembly 20 and, more particularly, the chassis elements 18 and 19 of the trailer and frame 24 of the wheel assembly are provided with cooperative guide structures effective to positionally locate the wheel assembly with respect to the trailer when the assembly is secured thereto, and also effective to interlockingly relate the wheel assembly to the trailer to constrain the same against relative longitudinal and transverse displacements. In the form shown, such guide structures have interfitting male and female components generally constituting tongue and groove or rib and recess components, as shown most clearly in FIG. 8. Thus, the longitudinally extending chassis elements 18 are provided with longitudinally extending recesses or grooves 35 adapted to be aligned with longitudinally extending tongues or ribs 36 extending upwardly from the top wall 37 of the wheel-assembly frame 24 and dimensioned to seat within the associated recess 35. Analagously, the transversely extending frame elements 19 of the trailer are provided with downwardly projecting tongues or ribs 38 adapted to align with and seat within mating recesses or grooves 39 provided along the top wall 37 of the wheel-assembly frame 24. As shown in FIG. 8, the tongues and grooves are tapered to facilitate seating of the tongues within the grooves, and to progressively bring about a predetermined positional alignment of the wheel assembly 20 and of the trailer 15. It will be apparent that when the various tongues 36 and 38 are seated within the recesses 35 and 39 therefor, an interlock is defined that constrains the wheel assembly 20 from both longitudinal and transverse displacements relative to the trailer 15.

Fastener mechanism is also included for releasably securing the wheel assembly 20 to the trailer 15 and frame structure thereof. The fastener mechanism may take variant forms and in the particular embodiment of the invention being considered, it constitutes four over-center latch devices respectively located adjacent the corner portions of the frame 24, as is evident in FIGS. 6 and 7. These latch devices are substantially identical and, therefore, the components and elements of each device are denoted with the same numerals although each device in its entirety is differentiated from the others by adding the suffixes $a$ through $c$ to the general identification numeral 40. In FIG. 7, the device 40b is in the latched position thereof, and the device 40c is released.

A latch post 41 welded or otherwise rigidly secured to the chassis element 19 of the trailer and provided with an upwardly-opening recess 42 therein. A latch bar 44 extending between two longitudinally spaced links 45 and 46 (see FIG. 6) is adapted to seat within the recess 42 and be cammed downwardly into tight locking engagement therewith. In this respect, the links 45 and 46 of their lower ends are connected with a pivot pin 47 extending therebetween which also extends through a cam crank 48 intermediate the ends thereof which is disposed between the links 45 and 46. The cam crank 48 is in the nature of a bell crank, and at one end thereof it is pivotally connected by a pin 49 that extends through a mounting bracket 50 welded or otherwise rigidly secured to the frame 24 of the wheel assembly 20. As shown in FIG. 6, the upper inner end of the cam crank 48 is bifurcated and straddles the bracket 50. At its outer opposite end, the cam crank 48 is provided with a recess 51 therein adapted to seat the end of a lever or handle 52 used to manipulate the cam crank and latch device generally between the lock and release positions thereof.

Rigidly secured to the frame 24 of the wheel assembly 20 in longitudinally spaced relation and in respective vertical alignment with the links 45 and 46 are a pair of ears 54 and 55 that are adapted to pass the lower end portion of the cam crank 48 therebetween, as shown in FIG. 6 and as illustrated by the device 40b in FIG. 7. The ears 54 and 55 are provided with aligned openings 56 therethrough adapted to removably seat a locking key 57 therein, as shown best in FIG. 6. The key 57 serves as a safety means to prevent inadvertent release of the device 40, and it may be provided with a cotter pin or safety wire to inhibit accidental removal of the key from the opening 56 in the ears 54 and 55.

When it is desired to manipulate a latch device 40 between the lock and release positions thereof, the associated key 57 is withdrawn from the ears 54 and 55, and the appropriate end of the handle 52 is inserted into the recess or opening 51 in the cam crank 48. Assuming as a starting position the condition depicted by the device 40b, the handle 52 is pivoted upwardly and outwardly to displace the cam crank 48 in a counterclockwise direction (referenced to the device 40c) about the pin 49. Such movement of the cam crank 48 elevates the links 45 and 46 together with the latch bar 44 carried thereby to remove the bar from the recess 42. The bar 44 and links 45 and 46 may then be swung in a clockwise direction (again referenced to the device 40c) about the pivot pin 47 to completely free the device from the latch post 41 and thereby maintain the device in its release condition.

Returning the device to the latch condition thereof, the cam crank 48 is swung upwardly to an intermediate position and the links 45 and 46 together with the latch bar 44 swung inwardly to align the latch bar with the recess 42. Next, the handle 52 is swung downwardly and inwardly to seat the bar 44 in the recess 42, and such movement is continued until the cam crank 48 is in the over-center position depicted by the device 40b in which the cam crank is in substantial abutment with the frame 24 of the wheel assembly. The handle 52 may then be removed from the opening 51, and the key 57 inserted through the opening 56 in the ears 54 and 55 and safety wired to establish a positive inhibition to movement of the cam crank toward the release condition thereof. It should be observed that the cam crank 48 tends to maintain itself in its latch position because of the over-center relationship it defines with the pivot pin 49 (see the device 40b in FIG. 7) so that there is little tendency for the cam crank to move inadvertently toward its release condition. It will be appreciated that the cam crank 48 progressively urges the trailer 15 and wheel assembly 20 toward each other as it moves into its latch position, thereby firmly seating the various tongues 36 and 38 in the grooves 35 and 39 therefor.

The trailer 15 is further provided with support structure secured to and depending from the frame structure 17 intermediate the ends thereof to support the trailer upon removal of the wheel assembly 20 therefrom. Such support structure is illustrated best in FIGS. 1 through 3, and is denoted generally with the numeral 58. As is best seen in FIG. 1, the support structure 58 has a framework of I-shaped configuration constituting a longitudinally extending web 59 disposed along the centerline of the trailer 15, and longitudinally spaced and transversely extending flanges 60 and 61 that project substantially from edge to edge of the trailer. The web 59 and flanges 60 and 61 are fixedly interconnected, as by means of being welded, and they are also fixedly secured to the frame structure of the trailer so as to be able to carry and support a load. In this respect, the support structure 58 is provided with a relatively strong skin or bottom wall 62 that is substantially coextensive in length and width with the web and flanges 59 through 61. Accordingly, the support structure 58 provides two relatively large cargo spaces along each side of the web 59 bounded at the ends by the flanges 60 and 61, along the bottom by the wall 58, and along the top by the undersurface of the van or cargo container 16 of the trailer. Depending upon the particular cargo to be carried by the support structure 58, the sides thereof may be open, as shown in FIG. 1, or closed by incorporating conventional doors or other closures.

Advantageously, the support structure 58 is as lightweight as practicable for purposes of maximizing the net weight that can be carried by the trailer 15, yet the support structure must be sufficiently strong to be able to support and maintain the entire weight of the trailer 15 and its contents, as explained in detail hereinafter. In this respect, the web 59 and flanges 60 and 61 may each constitute a relatively hollow truss-type structure as illustrated in FIG. 2. The web 59 shown in FIG. 2 includes a pair of transversely spaced, generally planar skins 64 and 65 that are substantially parallel and are spot welded or otherwise rigidly secured to reinforcing elements 66 and 67 respectively defining generally U-shaped and generally Z-shaped configurations. Each flange 60 and 61 is similarly constructed as shown by the flange 60 in FIG. 2 which has transversely extending and longitudinally spaced skins 68 and 69 that are generally planar and essentially parallel and such skins are rigidly secured to a plurality of reinforcing elements 70 and 71 of generally U-shaped and generally Z-shaped configurations, respectively. The web 59 and flanges 60 and 61 have substantial strength in compression, thereby enabling the same to support the trailer 15 and its contents and have also substantial strength in tension so that a load of substantial magnitude can be supported along the wall 62.

Figure 3:
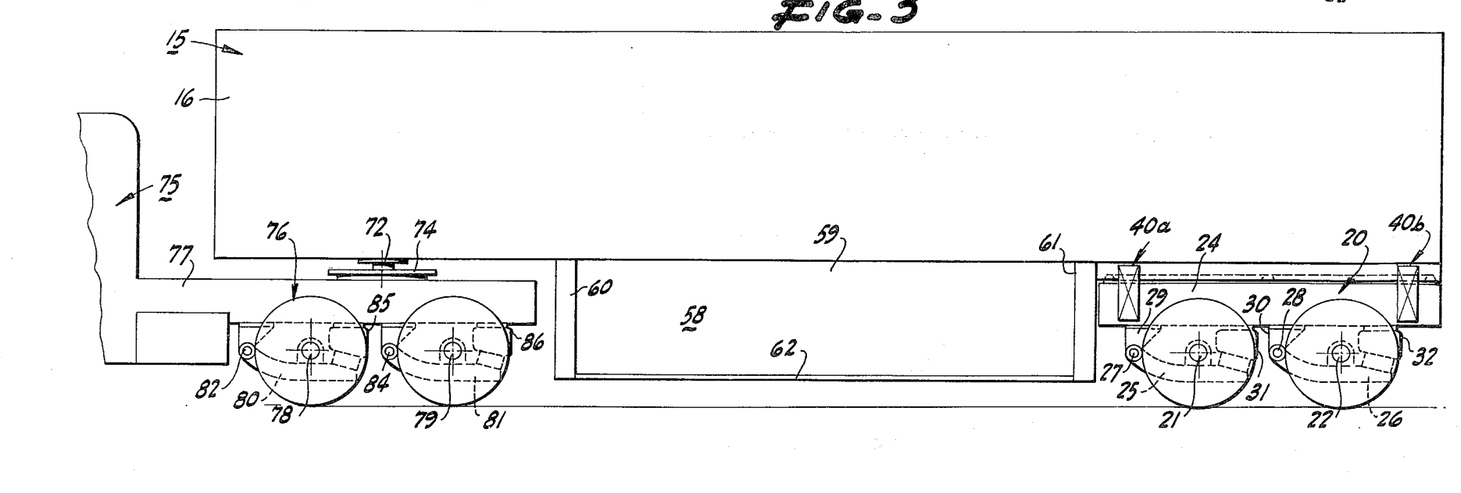
FIG. 3 is a broken side view in elevation of a tractor-trailer rig embodying the present invention and in condition for road travel.
Figure 4:
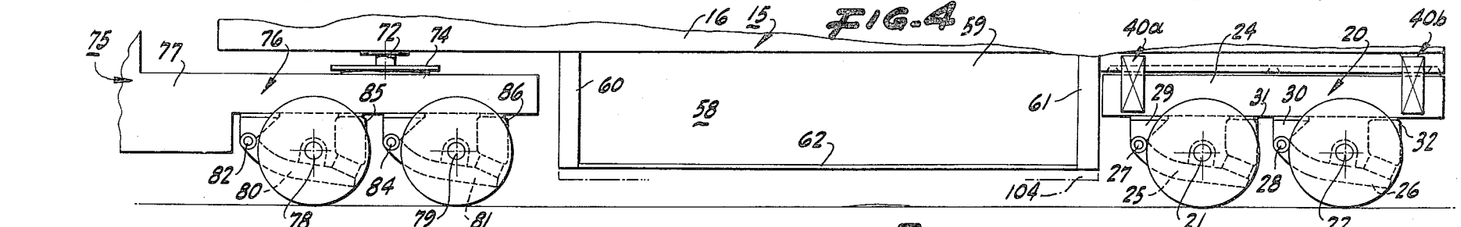
FIG. 4 is a broken side view in elevation, similar to that of FIG. 3, but illustrating the air suspension systems being overpressurized to elevate the semitrailer to an abnormally high elevation so that blocks can be inserted under the support structure.
Figure 5:
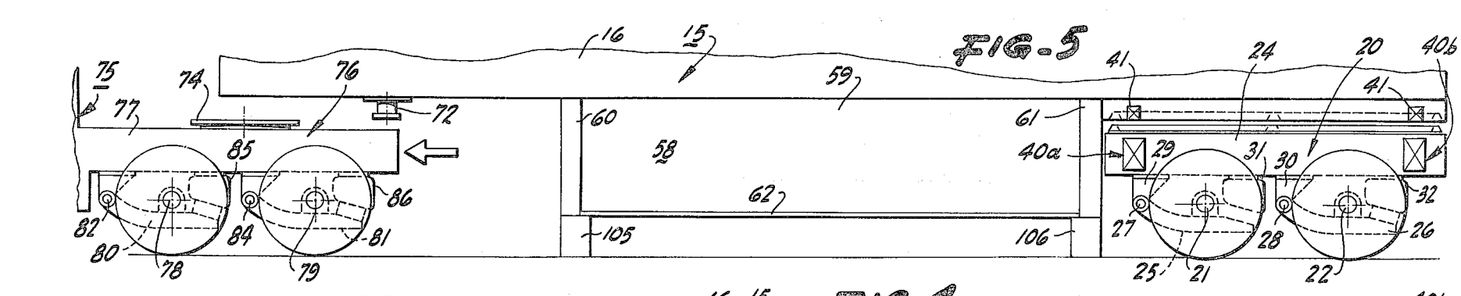
FIG. 5 is a broken side view in elevation, similar to that of FIG. 4, but illustrating the semitrailer and support structure thereof lowered onto blocks so that both the tractor and rear wheel assemblies can be removed.

The trailer 15 is adapted to be used with a tractor releasably connectable with the trailer so that it can be transported, when desired, as a road vehicle. In this reference, and as illustrated in FIGS. 3 through 5, the trailer 15 is equipped at the forward end portion thereof with the usual king-pin 72 for interconnection with the fifth-wheel assembly 74 of a tractor 75. As respects the present invention, the tractor 75 together with the fifth-wheel assembly 74 thereof and the king-pin 72 may be all conventional both as concerns the structural assemblage thereof and their function. The tractor 75 has an air suspension wheel assembly 76 generally similar to the wheel assembly 20 heretofore described.

In that reference, the tractor 75 has a frame or chassis component 77 to which the tandem wheel-equipped axles 78 and 79 are connected via arms 80 and 81 connected at the center portions thereof to the axles and pivotally connected at their forward ends by pins 82 and 84 to brackets rigidly secured to the chassis 77. Adjacent their rear ends, the arms 80 and 81 are respectively connected with the chassis 77 through air springs 85 and 86, respectively. Accordingly, the wheel assembly 76 has substantially the same construction as the wheel assembly 20 heretofore described.

The pneumatic pressure system for the rear wheel assembly 20 is illustrated in FIG. 9, and the four air springs respectively associated with the tandem axles 21 and 22 of such wheel assembly are diagrammatically shown in FIG. 9 and are again identified with the numerals 31 and 32. Compressed air for the system is developed by an air compressor (not shown) which delivers air under pressure to a reservoir or receiver 87 which is effective to maintain a supply of compressed air at a pressure of the order of 120 psig. The reservoir 87 is connected to each of the air springs 31 and 32 via a flow system that includes a distribution conduit 88 leading from the reservoir to a pair of automatically operative load-leveling pressure controls 89 and 90 operative to maintain the trailer 15 at a predetermined elevation relative to the axles 21 and 22, and level as between the left side and right side of the trailer. The controls 89 and 90 incorporate a time delay mechanism therein to accommodate momentary road irregularities traversed by the trailer. The controls 89 and 90 are respectively connected to the air springs 31 and 32 on the associated sides of the vehicles via distribution conduits 91 and 92. As respects the components of the system so far described, they are essentially conventional and are well known in the art.

Figure 9:
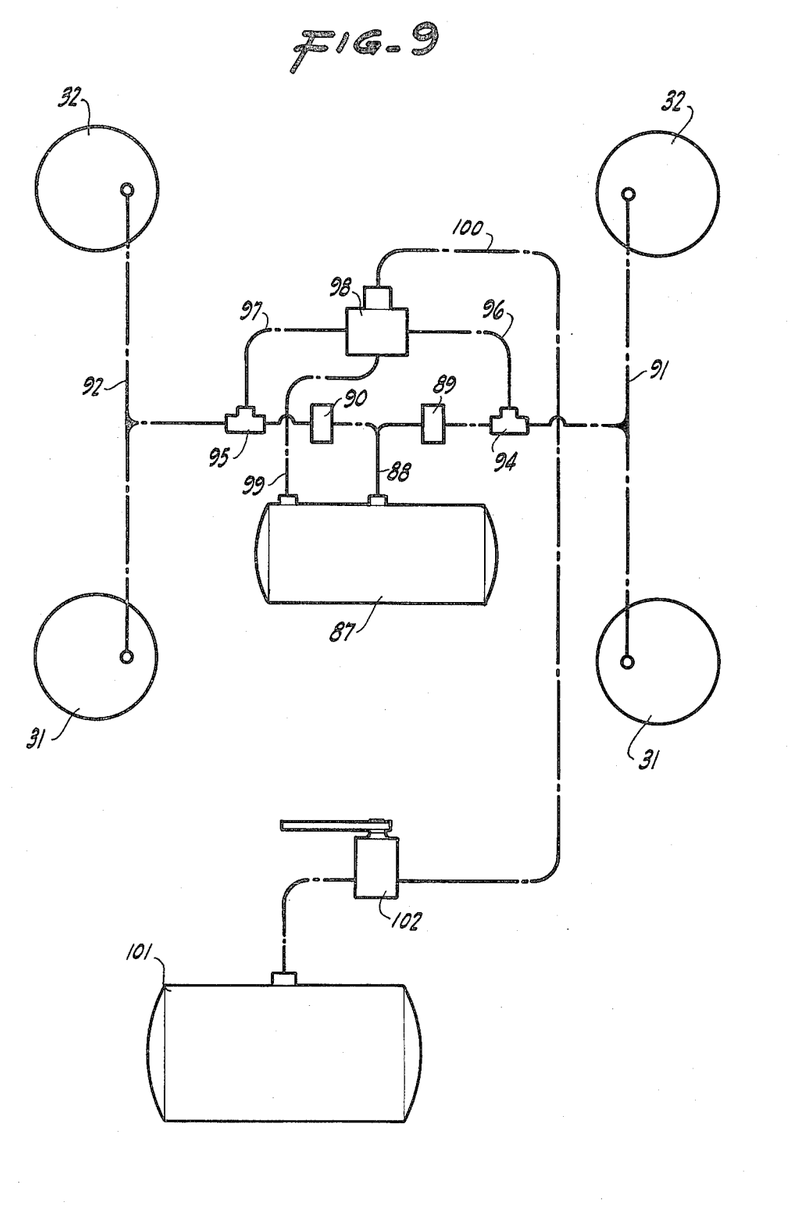
FIG. 9 is a schematic flow diagram of the air suspension system forming a part of the rear wheel assembly for the semitrailer.

Respectively interposed in the flow conduits 91 and 92 intermediate the controls 89 and 90 and their associated air springs 31 and 32 are double-acting check valves 94 and 95 through which compressed air is normally delivered without influence from the controls 89 and 90 to the air springs 31 and 32 connected therewith. The check valves 94 and 95 are connected via flow conduits 96 and 97 to a pressure-responsive, relay-type control valve 98 at the distribution orifices thereof. High pressure air is supplied continuously to the control valve 98 from the reservoir 87 via a flow conduit 99, and control air is delivered to the valve via a conduit 100 that connects with a compressed air receiver or reservoir 101 located at the tractor 75. The reservoir 101 is charged with compressed air delivered thereto by an air compressor (not shown) that forms a part of the tractor assemblage and also delivers the compressed air supply to the reservoir 87. A manually operable valve 102 is interposed in the conduit 100 intermediate the control valve 98 and reservoir 101. The control valve 102 is usually located within the cab of the tractor 75 so that it can be manipulated from therewithin. It will be apparent that the conduit 100 must have a coupling (not shown) therealong to enable the conduit sections respectively provided by the trailer and by the tractor to be selectively interconnected and disconnected in accordance with whether the tractor is or is not coupled to the trailer.

The load leveling controls 89 ad 90 are essentially three-way valves arranged with sensors that and the relative elevations of the axles of the wheel assembly 20 and the trailer, and they function to deliver more air to the air springs 31 and 32 when the trailer tends to move downwardly so as to return the trailer to a predetermined elevation, and to permit the escape of air from the air springs 31 and 32 whenever the trailer tends to rise an abnormally high elevation. The check valves 94 and 95 may be multiple position spool or shuttle valves, and the control valve 98 may similarly be a spool-type valve responsive to the delivery of control pressures thereto via the conduit 100. The manually operable valve 102 may be a three-position valve effective to inhibit flow of fluid from the reservoir 101 to the valve 98, to permit such flow, and to vent the valve 98 and conduit 100 intermediate the valves 98 and 102. The check valves 94 and 95, control valve 98, and manually manipulatable valve 102 constitute an override system that enables the operator of the vehicle to overinflate or overpressurize the air springs 31 and 32 for the purpose of elevating the trailer to an abnormally high position, and to enable the air springs 31 and 32 to be depressurized to an abnormally low pressure.

Turning now to a description of an operational cycle, and assuming as the starting condition the configuration shown in FIG. 3, the tractor 75 is coupled to the trailer 15 via the king-pin and fifth-wheel assembly 72, 74, and the wheel assembly 20 is fixedly secured to the trailer by the latch devices 40. Accordingly, the tractor-and-trailer rig is arranged as a road vehicle and can be transported from one location to another. At this time, the container 16 may be filled or empty depending upon whether the trailer is used to transport a shipment of goods to a predetermined location or is being returned empty. Similarly, the support structure 58 and cargo carrier that it defines may be loaded or empty.

Upon reaching its designation and the trailer 15 being properly positioned at a loading dock or other place for storage or off-loading, the driver of the tractor 75 manipulates the manually operable valve 102 to override the controls 89 and 90 and effect overinflation of the air springs 31 and 32 of the wheel assembly 20, and overinflation of the air springs 85 and 86 of the tractor wheel assembly 76. In this last reference, it will be understood that the tractor wheel assembly 76 is similarly equipped with an override system analagous to that of FIG. 9 to enable the air springs 85 and 86 to be selectively overinflated and underinflated in the same manner and for the same purposes as the air springs 31 and 32 of the wheel assembly 20. Further, the two override systems are advantageously connected in parallel and incorporate the same control valve 102 so that manipulation of that valve results in the air springs of the two wheel assemblies 20 and 76 being inflated and deflated concurrently. Therefore, when the driver manipualtes the valve 102, the air springs will be overinflated and elongated in the vertical direction, as is evident in a comparison of FIGS. 3 and 4, to displace the entire trailer 15 upwardly so that the support structure 58 is raised to an abnormal elevation as is evident by comparing the position of the wall 62 of the support structure 58 as it is shown in FIG. 4 with the reference line 104 that depicts the normal elevation of the wall 62 and corresponds to the position thereof shown in FIG. 3.

The driver next places a plurality of blocks 105 and 106 beneath the support structure 58 in substantial alignment with the flanges 60 and 61 thereof, as shown in FIG. 5. He then releases each of the latch devices 40 and manipulates the valve 102 so as to underpressurize the air suspension systems and air springs 31, 32 and 85, 86 thereof whereupon the trailer 15 descends until the support structure 58 engages the blocks 105 and 106 whereupon the entire trailer 15 is supported thereby. The air springs continue to be deflated, thereby retracting the wheel assembly 20 from engagement with the trailer 15 and similarly retracting the wheel assembly 76 of the tractor 75 from the trailer. Thereafter, the tractor 75 may be driven forwardly to separate it completely from the trailer 15, and the rear wheel assembly 20 may be withdrawn from the trailer either by rolling the wheely assembly rearwardly or by displacing it laterally by a forklift truck or other mechanism (not shown).

The tractor 15 may remain in such position supported upon the blocks 105 and 106 until the container 16 thereof is completely off-loaded or until the storage capability defined by the container 16 is no longer required. In the meantime, however, the tractor 75 is available for use with other trailers, and the wheel assembly 20 is also available for use with other trailers. As a result, the expensive tractor 75 and relatively expensive wheel assembly 20 can both be used continuously, whereas the relatively inexpensive trailer 15 can be used economically for storage and other purposes for as long as required.

A generally reverse procedure is followed in reuniting the wheel assembly 20 and tractor 75 with the trailer 15. In this respect, the wheel assembly 20 is positioned beneath the rear end portion of the trailer 15 when the air springs 31 and 32 are underinflated, and the wheel assembly is oriented so that the various tongues 36 and 38 align with the grooves 35 and 39. The tractor 75 is backed into position to orient the king-pin 72 for coupling with the fifth-wheel assembly 74, and the various pneumatic lines between the tractor and trailer are coupled. The various air bags are then overinflated to return the trailer 15 to the position thereof shown in FIG. 4, whereupon the blocks 105 and 106 are freed and are withdrawn from beneath the support structure 58. Prior to such withdrawal, it may be desirable to first manipulate each of the latch devices 40 into the latch positions thereof to unite the wheel assembly 20 and trailer 15. After the blocks 105 and 106 are withdrawn, the driver manipulates the control valve 102 to return the trailer 15 toward the normal elevation thereof illustrated in FIG. 3. The driver may tend to underinflate the air springs, whereupon the automatic leveling valves 89 and 90 will return the trailer to a correct orientation as soon as the override system is de-energized; or the driver may simply de-energize the system whereupon normal operation of the automatic valves 89 and 90 will return the trailer to its proper orientation.

The described assemblage provides an inexpensive freight container that is loadable and unloadable as a unit without requiring the use of extensive lifting machinery. When unloaded and stored at a loading dock or other facility, the content thereof can be removed as required and, for example, in conformity with the demand of automatic machinery processing the contents of the container. The arrangement adds very little weight and mechanism to the average truck and semi-trailer rig used as a highway vehicle, and it may increase the storage capacity thereof in those instances in which the support structure 58 is used as a cargo carrier. For the most part, standard equipment may be employed, modified in accordance with the foregoing description.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

What is claimed is:

1. A semitrailer or the like, comprising:
   a. frame structure defining a chassis equipped with load-carrying apparatus;
   b. air suspension wheel assembly removably securable to said frame structure adjacent the rear end of said trailer;
   c. fastener mechanism for releasably securing said wheel assembly to said frame structure, said fastener mechanism including a plurality of latch devices having cooperative components respectively provided by said frame structure and wheel assembly each of said latch devices being selectively movable between latch and release conditions, each of said latch devices providing an over-center action in which the device tends to maintain itself selectively in each of the latch and release conditions thereof, and in which each latch device is equipped with a releasable safety to constrain the device in the latch position thereof to prevent inadvertant movement of the device into its release condition;
   d. support structure secured to and depending from said frame structure intermediate the ends thereof to support said trailer upon removal of said wheel assembly;
   e. means for overpressurizing the air-suspension of said wheel assembly to enable said frame and support structures to be raised to an abnormal elevation for insertion of support blocks under the latter to engage the same and support said trailer upon subsequent reduction of pressure in the air suspension system to underpressurize the same and enable said wheel assembly to be removed from said frame structure upon release of said fastener mechanism;
   f. and a king-pin carried by said trailer adjacent the front end portion thereof to enable the same to be releasably interconnected with the fifth-wheel assembly of a tractor.

2. The trailer of claim 1 and further comprising constraining means having interconnecting elements respectively provided by trailer frame structure and by said wheel assembly and being operative to constrain the trailer and wheel assembly against relative longitudinal and transverse displacement.

3. The trailer of claim 2 in which said constraining means and interconnecting elements thereof comprise a plurality of longitudinally and transversely extending grooves and a plurality of longitudinally and transversely extending tongues respectively receivable within said grooves.

4. The trailer of claim 3 in which each of said grooves and each of said tongues is tapered to enforce a predetermined relative alignment on said trailer and wheel assembly upon insertion of said tongues within said grooves.

5. The trailer of claim 1 in which said wheel assembly includes a plurality of pressurizable air springs and a pneumatic flow system interconnecting the same and equipped with an automatic leveling control operative to inflate and deflate said air springs selectively to maintain said trailer at a predetermined elevation relative to said wheel assembly, and in which said means for over-pressurizing and under-pressurizing said air-suspension includes override means connected in circuit with said flow system and having a manually operable control valve to selectively energize said override means for such over and under-pressurization thereby.

6. The trailer of claim 1 in which said wheel assembly is removably securable to said frame structure adjacent the rear end of said trailer; and further comprising a king-pin carried by said trailer adjacent the front end portion thereof to enable the same to be releasably interconnected with the fifth-wheel assembly of a tractor; and further comprising constraining means having interconnecting elements respectively provided by trailer from structure and by said wheel assembly and being operative to constrain the trailer and wheel assembly against relative longitudinal and transverse displacement.

7. The trailer of claim 6 in which said fastener mechanism includes a plurality of latch devices having cooperative components respectively provided by said frame structure and wheel assembly, each of said latch devices being selectively movable between latch and release conditions; in which said wheel assembly includes a plurality of pressurizable air springs and a pneumatic flow system interconnecting the same and equipped with an automatic leveling control operative to inflate and deflate said air springs selectively to maintain said trailer at a predetermined elevation relative to said wheel assembly, and in which said means for overpressurizing and under-pressurizing said air-suspension includes override means connected in circuit with said flow system and having a manually operable control valve to selectively energize said override means for such over and underpressurization thereby.

8. The trailer of claim 7 in which said support structure includes both longitudinally and transversely extending components each of which is generally hollow and is equipped with interior reinforcing; and in which said longitudinally and transversely extending components define a generally I-shaped configuration, and in which said support structure further includes bottom wall means providing a cargo space adapted to receive and support freight therein.

9. The trailer of claim 8 in which each of said latch devices provides an over-center action in which the device tends to maintain itself selectively in each of the latch and release conditions thereof, and in which latch device is equipped with a releasable safety to constrain the device in the latch position thereof to prevent inadvertent movement of the device into its release condition; in which said constraining means and interconnecting elements thereof comprise a plurality of longitudinally and transversely extending grooves and a plurality of longitudinally and transversely extending tongues respectively receivable within said grooves; in which each of said grooves and each of said tongues is tapered to enforce a predetermined relative alignment on said trailer and wheel assembly upon insertion of said tongues within said grooves.

10. A semitrailer or the like, comprising:
   a. frame structure defining a chassis equipped with load-carrying apparatus;
   b. an air suspension wheel assembly removably securable to said frame structure adjacent one end portion thereof;
   c. fastener mechanism for releasably securing said wheel assembly to said frame structure;
   d. support structure secured to and depending from said frame structure intermediate the ends thereof to support said trailer upon removal of said wheel assembly, said support structure including both longitudinally and transversely extending components each of which is generally hollow and is equipped with interior reinforcing;
   e. and means for overpressurizing the air-suspension of said wheel assembly to enable said frame and support structures to be raised to an abnormal elevation for insertion of support blocks under the latter to engage the same and support said trailer upon subsequent reduction of pressure in the air suspension system to underpressurize the same enable said wheel assembly to be removed from said frame structure upon release of said fastener mechanism.

11. The trailer of claim 10 in which said longitudinally and transversely extending components define a generally I-shaped configuration, and in which said support structure further includes bottom wall means providing a cargo space adapted to receive and support freight therein.

* * * * *